(12) United States Patent
Tabor et al.

(10) Patent No.: US 7,377,480 B2
(45) Date of Patent: May 27, 2008

(54) ELECTROHYDRAULIC VALVE SERVOMECHANISM WITH ADAPTIVE RESISTANCE ESTIMATOR

(75) Inventors: Keith A. Tabor, Richfield, WI (US); Joseph L. Pfaff, Wauwatosa, WI (US)

(73) Assignee: HUSCO International, Inc., Waukesha, WI (US)

( * ) Notice: Subject to any disclaimer, the term of this patent is extended or adjusted under 35 U.S.C. 154(b) by 440 days.

(21) Appl. No.: 11/083,585

(22) Filed: Mar. 18, 2005

(65) Prior Publication Data
US 2005/0211936 A1    Sep. 29, 2005

Related U.S. Application Data

(60) Provisional application No. 60/556,115, filed on Mar. 25, 2004.

(51) Int. Cl.
   *G05B 11/28* (2006.01)
(52) U.S. Cl. .................... 251/129.04; 251/129.05; 318/599; 361/160
(58) Field of Classification Search ........... 251/129.04, 251/129.05, 129.15; 361/160; 318/599
See application file for complete search history.

(56) References Cited

U.S. PATENT DOCUMENTS

| | | | | |
|---|---|---|---|---|
| 3,874,407 A | * | 4/1975 | Griswold | 251/129.05 |
| 4,741,365 A | * | 5/1988 | Van Ornum | 251/129.05 |
| 4,838,037 A | * | 6/1989 | Wood | 251/129.05 |
| 5,020,564 A | * | 6/1991 | Thoman et al. | 251/129.05 |
| 5,135,031 A | * | 8/1992 | Burgess et al. | 251/129.05 |
| 5,335,565 A | * | 8/1994 | Ito et al. | 251/129.08 |
| 5,787,915 A | * | 8/1998 | Byers et al. | 137/1 |
| 5,915,667 A | * | 6/1999 | Kim et al. | 251/129.08 |
| 6,012,437 A | * | 1/2000 | Radhamohan et al. | 251/129.11 |
| 6,328,275 B1 | | 12/2001 | Yang et al. | |
| 6,427,971 B1 | * | 8/2002 | Kawabe et al. | 251/129.04 |
| 6,662,790 B1 | * | 12/2003 | Kawamura et al. | 251/129.12 |
| 6,840,257 B2 | * | 1/2005 | Dario et al. | 251/129.01 |
| 2004/0011339 A1 | * | 1/2004 | Sanchez et al. | 123/520 |

* cited by examiner

*Primary Examiner*—John Bastianelli
(74) *Attorney, Agent, or Firm*—Quarles & Brady; George E. Haas

(57) ABSTRACT

A servomechanism includes a controller which dynamically estimates the resistance of the solenoid coil in an electrohydraulic valve as part of determining a level of electric voltage to apply to open the valve. The servomechanism receives a current setpoint designating a desired electric current level and senses the actual level of current flowing through the coil. A proportional term is derived from the current setpoint and the actual level of current. Creation of a derivative term is based on the difference between the current setpoint and the actual level of current. A feedforward term is produced by estimating the resistance of the electrohydraulic valve and limiting the feedforward term to a predefined range of acceptable values. The proportional term, derivative term, and the feedforward term are summed to define a desired voltage level, and a PWM signal for driving the electrohydraulic valve is generated based on the desired voltage level.

16 Claims, 2 Drawing Sheets

ELECTROHYDRAULIC VALVE SERVOMECHANISM WITH ADAPTIVE RESISTANCE ESTIMATOR

CROSS-REFERENCE TO RELATED APPLICATIONS

This application claims benefit of U.S. Provisional Patent Application No. 60/556,115 filed Mar. 25, 2004.

STATEMENT REGARDING FEDERALLY SPONSORED RESEARCH OR DEVELOPMENT

Not Applicable

BACKGROUND OF THE INVENTION

1. Field of the Invention

The present invention relates to hydraulic power systems with electrically operated control valves, and more particularly to electrical servomechanisms that control the application of electricity to such valves.

2. Description of the Related Art

A wide variety of machines have moveable members which are driven by an hydraulic actuator, such as a cylinder and piston arrangement, that is controlled by a hydraulic valve. For example, backhoes have a tractor on which is mounted a boom, arm and bucket assembly with each of those components being driven by one of more cylinder-piston arrangements. The flow of fluid to and from each hydraulic actuator is controlled by a hydraulic valve that traditionally has been manually operated by the machine operator.

There is a present trend away from manually operated hydraulic valves toward electrical controls and the use of solenoid valves. This type of control simplifies the hydraulic plumbing, as the control valves do not have to be located near an operator station, but can be located adjacent the hydraulic actuator being driven by the fluid. This change in technology also facilitates computerized control of the machine functions.

Application of pressurized fluid from a pump to the hydraulic actuator can be controlled by a set of proportional, solenoid operated pilot valves. These valves employ a solenoid coil which generates a magnetic field that moves an armature in one direction to open a valve. The armature acts on a pilot poppet which opens and closes a pilot passage that in turn causes a main valve poppet to move with respect to a primary valve seat located between the inlet and outlet of the valve. The amount that the valve opens is directly related to the magnitude of electric current applied to the solenoid coil, thereby enabling proportional control of the hydraulic fluid flow. Either the armature or another component is spring loaded to close the valve when electric current is removed from the solenoid coil.

When an operator desires to move a member on the machine, an input device, such as a joystick, is manipulated to produce an electrical signal that indicates the desired motion. This signal is received by a controller which responds by applying electric current to the solenoid valves connected to the hydraulic actuator associated with the machine member. To drive a cylinder-piston type hydraulic actuator, one solenoid valve is opened to supply pressurized fluid to a cylinder chamber on one side of the piston and another solenoid valve opens to drain fluid from the opposite cylinder chamber. Varying the magnitude of electric current applied to the solenoid valves alters the amount of fluid flow to the hydraulic actuator, thereby moving the machine member at proportionally different speeds.

Therefore, precise control of the electric current that is applied to the solenoid valve is essential for accurate control of the machine motion. However, it is difficult to precisely control the electric current. For one thing, the resistance of the solenoid coil changes significantly with temperature, which may vary from below −20° C. to over 100° C. for hydraulic equipment used outdoors. As a result, a given voltage level applied to the valve can produce different steady state electric current levels depending upon the temperature of the solenoid coil. Another factor affecting control accuracy is the back electromotive force (emf) that is generated as the solenoid armature moves. The back emf affects the net magnitude of electric current flowing through the solenoid coil. In addition, operation of the solenoid and the valve elements tend to be non-linear which makes their modeling difficult for control purposes.

Therefore, it is desirable to account for variation of the solenoid coil resistance when determining the magnitude of electric voltage to apply to open the hydraulic valve the desired amount.

SUMMARY OF THE INVENTION

A servomechanism that operates an electrohydraulic valve includes a stage that estimates the resistance of a coil in the valve and adjusts the level of electric voltage applied to the valve in response to changes of that resistance estimate.

The servomechanism receives a current setpoint which designates a desired level of electric current to be applied to a coil of the electrohydraulic valve and also senses an actual level of electric current flowing through the coil. A proportional term is produced based on a current error obtained from current setpoint and the actual level of electric current. The actual level of electric current also is used to produce a coil resistance value. The coil resistance value and the proportional term are employed to derive a desired voltage level for the coil which then is used to generate a PWM signal for driving the coil.

Preferably, the coil resistance value is derived by determining an estimated resistance based on the actual level of electric current and a previous desired voltage level. A resistance error then is determined as the difference between the estimated resistance and a previous coil resistance value. The resistance error is multiplied by an observer gain value and the result is added to the previous coil resistance value to produce a new coil resistance value.

In a preferred embodiment, a desired voltage level is derived by multiplying the new coil resistance value by the current setpoint and adding the product to the proportional term. A derivative term also may be added to produce the desired voltage level. That derivative term is obtained by multiplying a derivative gain value by a derivative of the current error.

DETAILED DESCRIPTION OF THE INVENTION

Figure 1:
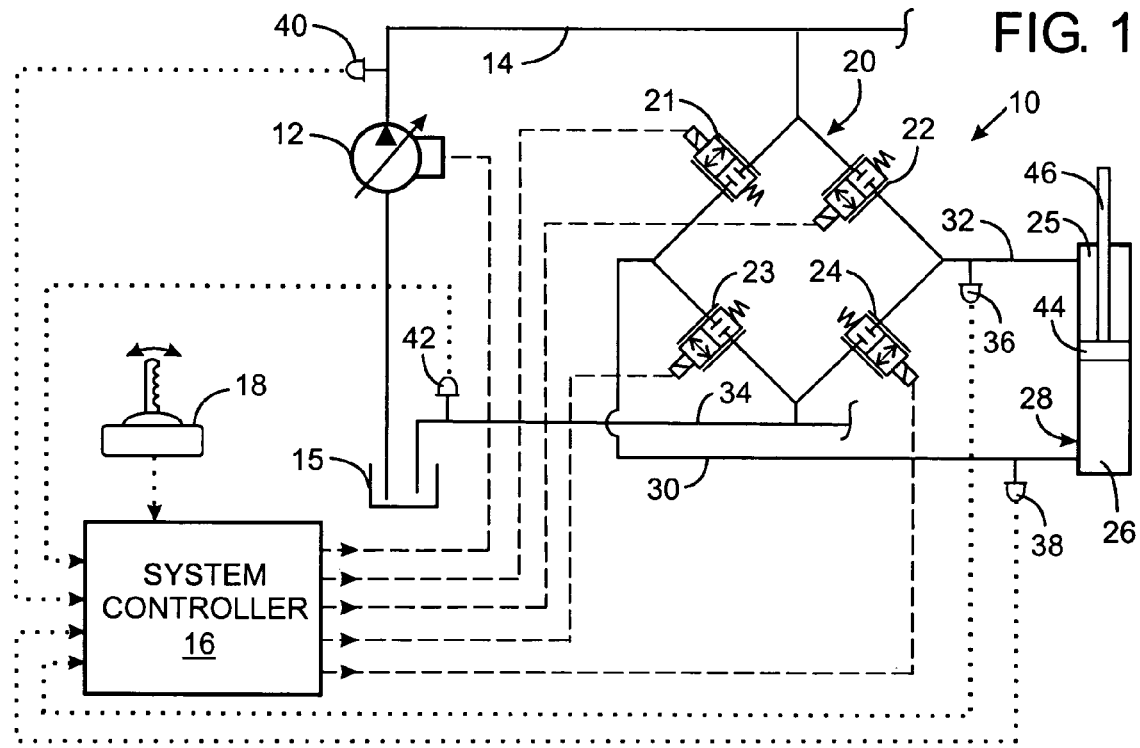
FIG. 1 is a schematic diagram of a hydraulic system which employs the present invention.

With initial reference to FIG. 1, a machine such as an agricultural or construction vehicle has mechanical members that are operated by a hydraulic system. The hydraulic system 10 includes a variable displacement pump 12 that is driven by a motor or engine (not shown) to draw hydraulic fluid from a tank 15 and furnish the hydraulic fluid under pressure into a supply line 14.

The supply line 14 is connected to a valve assembly 20 comprising four proportional electrohydraulic (EH) valves 21, 22, 23 and 24 that control the flow of hydraulic fluid to and from a hydraulic actuator, such as cylinder 28, in response to electricity from a system controller 16. The first EH valve 21 governs the flow of fluid from the supply line 14 to a first conduit 30 connected to the head chamber 26 of the cylinder 28. The second EH valve 22 selectively couples the supply line 14 to a second conduit 32 which leads to the rod chamber 25 of the cylinder 28. The third EH valve 23 is connected between the first conduit 30 and a return line 34 that leads to the system tank 15. The fourth EH valve 24 controls flow of fluid between the second conduit 32 and the return line 34. Each of the four EH valves 21-24 may be a pilot operated valve that is driven by a solenoid, such as the valve described in U.S. Pat. No. 6,328,275, for example. The flow of fluid through this type of valve is proportionally controlled by varying the magnitude of electric current applied to the coil of the solenoid.

The system controller 16 receives signals from a user input device, such as joystick 18 or the like, and from a number of pressure sensors. One pair of pressure sensors 36 and 38 detect the pressure within the cylinder rod and head chambers 25 and 26, respectively. Another pressure sensor 40 is placed in the supply line 14 near the outlet of the pump 12, while pressure senor 42 is located in the tank return line 34, to provide pressure measurement signals to the system controller 16. The system controller 16 executes a software program that responds to these input signals by producing output signals which control the variable displacement pump 12 and the four EH valves 21-24.

Figure 2:
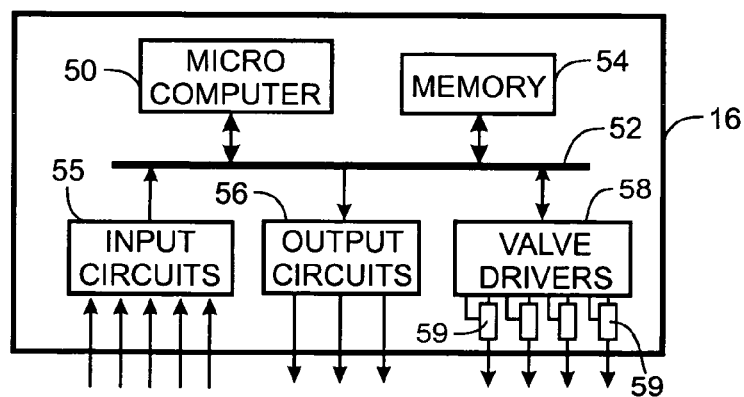
FIG. 2 is a block diagram of the system controller for the hydraulic system.

With reference to FIG. 2, the system controller 16 includes a microcomputer 50 which is connected by a conventional set of signal busses 52 to a memory 54 in which the software programs and data used by the microcomputer are stored. The set of signal busses 52 also connects input circuits 55 and output circuits 56 to the microcomputer 54. The input circuits 55 interface the user input device and the pressure sensors to the system controller and the output circuits 56 provide signals to devices that indicate the status of the hydraulic system 10 and the functions being controlled.

A set of valve drivers 58 responds to the microcomputer commands by generating pulse width modulated (PWM) signals that are applied to the solenoid coils of the EH valves 21-24. Each PWM signal is generated in a conventional manner by switching a DC voltage at a given frequency. When the hydraulic system is on a vehicle, such as an agricultural tractor, the DC voltage is supplied from a battery and alternator. By controlling the duty cycle of the PWM signal, the magnitude of electric current applied to the solenoid coil of a given valve can be varied, thus altering the degree to which that valve opens. Each valve driver 58 is associated with a current sensor 59 that produces a signal indicating the magnitude of electric current flowing to the respective EH valve 21-24. A value indicating the sensed current magnitude is available for reading by the microcomputer 50. For each EH valve 21-24, the microcomputer synchronously averages an integral number of current samples acquired during each period of the PWM signal to derive a value for the actual coil current of that valve.

In order to extend the rod 46 from the cylinder 28, the operator moves the joystick 18 in the appropriate direction to indicate the desired movement to the system controller 16. This motion of the joystick sends an electrical signal to the system controller to indicate the desired velocity for the associated machine member. The system controller 16 responds to the joystick signal by generating a current setpoint designating a desired electric current magnitude for driving the solenoid coils of selected EH valves in order to produce the motion designated by the machine operator.

In the case of extending the rod 46, the generated current setpoints activate the first and fourth EH valves 21 and 24 thereby sending pressurized hydraulic fluid from the supply line 14 through the first EH valve into the head chamber 26 of cylinder 28. The application of that fluid causes movement of the piston 44 which extends the piston rod 46. That piston motion also forces fluid from the rod chamber 25 through the fourth EH valve 24 to the tank 15. The system controller 16 monitors the pressure in the various hydraulic lines to ensure that proper motion occurs.

To retract the rod 46 into the cylinder 28, the system controller 16 opens the second and third EH valves 22 and 23, which sends pressurized hydraulic fluid from the supply line 14 into the cylinder's rod chamber 25 and exhausts fluid from the head chamber 26 to tank 15.

To obtain the commanded motion, the controller 16 executes a software program that responds to the signals from the joystick 18 and the pressure sensors by producing current setpoint values which define levels of electric current to open selected ones of the EH valves 21-24 the desired amounts. As noted previously, the actual degree to which a given electric voltage opens the EH valve is a function of the resistance of the valve's solenoid coil and that resistance varies with temperature and other factors. Nevertheless, the dynamically varying coil resistance is difficult to measure and has not been measured or estimated previously by the valve control circuits. However, with an ever increasing desire for greater accuracy in machine control and for more automatic control with reduced operator intervention, compensation for variation of a valve's performance due to temperature changes is highly desirable.

Figure 3:
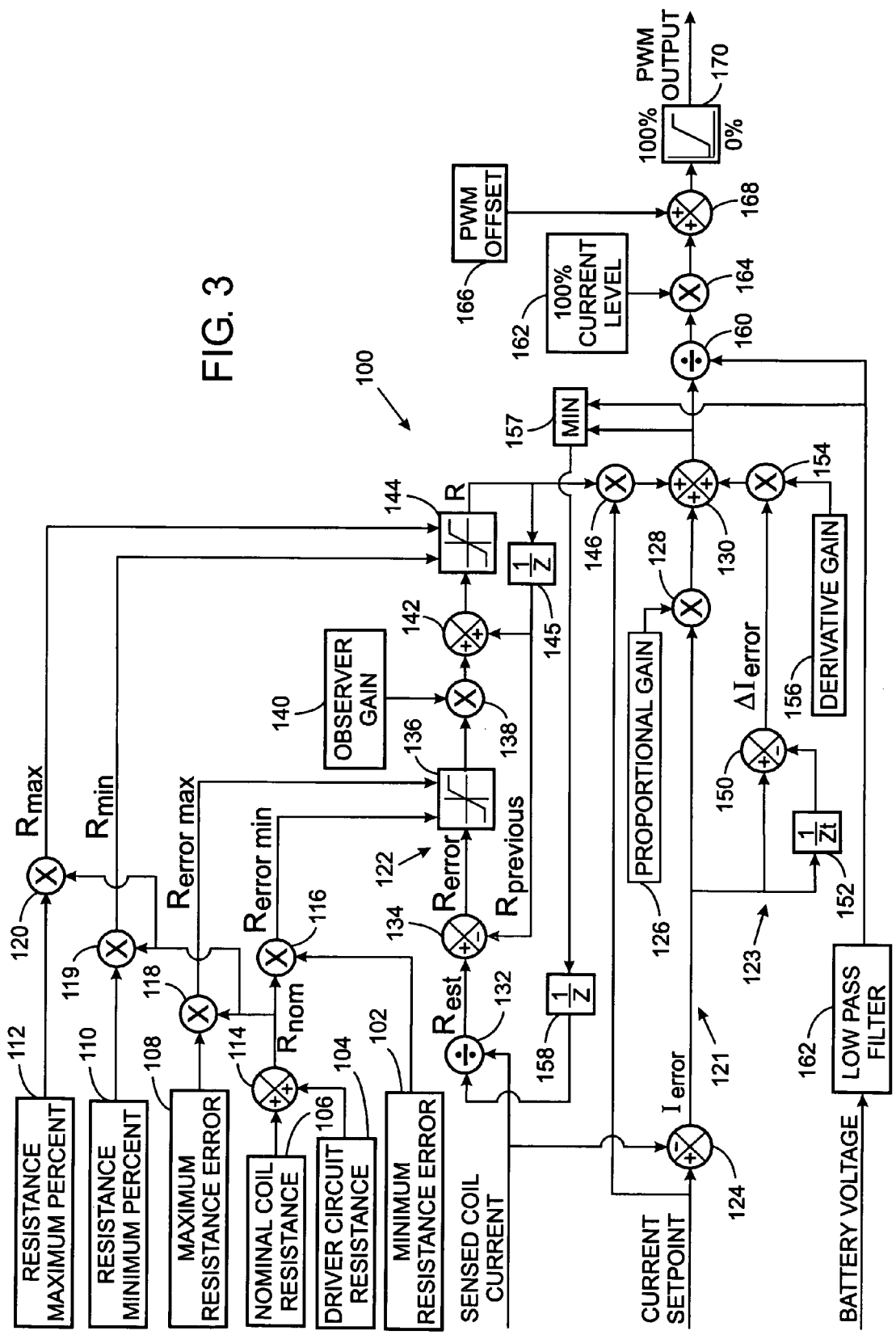
FIG. 3 is a control diagram depicting the operation of a current servomechanism that is implemented by the system controller.

The valve control software program includes a routine that implements a control function which adjusts the voltage setpoint (i.e. the PWM duty cycle) for each EH valve 21-24 to compensate for changes in the solenoid coil resistance. The current compensation function 100, depicted for one of the valves by the control diagram in FIG. 3, utilizes a set of defined constants which are stored in the memory 54 of the controller 16 and are represented by boxes 102-112 in the upper left corner of the control diagram. A constant nominal coil resistance value 106 specifies the ideal resistance at a nominal operating temperature for the solenoid coil in the type of valve being controlled. A similar nominal resistance value 104 for the valve driver 58 also is provided. These two nominal resistance values are added together at a first summing node 114 to produce a nominal resistance value $R_{nom}$.

This nominal resistance value $R_{nom}$ then is used to define upper and lower limits for a resistance error signal that is produced in another section of function 100, as will be described. These limits prevent the resistance error signal from drifting beyond a range of acceptable values, and prevent small errors at very low current setpoint values from producing a significant change in the resistance estimate. Specifically, a lower resistance error limit ($R_{error\ min}$) is produced at the output of a first multiplier 116 which receives the nominal resistance value from summing node 114 and a constant minimum resistance error percentage value 102 (e.g. −10%). A similar upper resistance error limit ($R_{error\ max}$) is produced at the output of a second multiplier 118 as the product of the nominal resistance value and a constant maximum resistance error percentage 108 (e.g. +10%).

Similarly, the nominal resistance value is used to define another pair of limits which specify maximum and minimum values of the resistance estimate derived by the current compensation function 100. Specifically, the nominal resistance value $R_{nom}$ is multiplied by a constant minimum percentage 110 (e.g. 67%) in multiplier 119 to produce the minimum coil resistance value $R_{min}$. A similar derivation of the upper resistance limit $R_{max}$ is produced at the output of a fourth multiplier 120 that combines a constant maximum percentage 112 (e.g. 166%) with the nominal resistance value $R_{nom}$. These defined limits are employed elsewhere by the control function 100, as will be described.

The current compensation function 100 comprises a first processing stage 121 that produces a proportional term, a second processing stage 122 that produces an feedforward term, and a third processing stage 123 that produces a derivative term. The current compensation function 100 receives the current setpoint, which specifies the level of electric current to open the associated hydraulic valve the amount necessary to create the fluid flow needed to produce the desired machine motion. A value corresponding to the actual current flowing through the valve, as indicated by the respective current sensor 59, is subtracted from the current setpoint to produce an current error value $I_{error}$ at a second summing node 124 in the first processing stage 121. The current error value then is multiplied by a constant proportional gain 126 at fifth multiplier 128 to produce a proportional term that is applied to one input of a third summing node 130.

In the second processing stage 122, the actual coil current value also is applied to the divisor input of a first divider 132, which has a dividend input that receives a previous value of a desired voltage level for the PWM signal. That previous value was produced during the prior computation cycle of the compensation function 100, as will be described, and corresponds to the present voltage applied across the solenoid coil of the respective valve. The resultant value produced at the output of the first divider 132 is an estimate of the resistance, $R_{est}$. This resistance estimate is applied to one input of a fourth summing node 134 that subtracts a previous resistance value $R_{previous}$, that was produced during the previous computation cycle and fed back to the fourth summing node. The output of the fourth summing node 134 is a resistance error $R_{error}$ corresponding to the difference between the newly estimated resistance and the previous resistance value. The resistance error $R_{error}$ then is limited by a first limiter 136 to the range of values as set by the upper and lower error limits $R_{error\ max}$ and $R_{error\ min}$. The output of the first limiter 136 is multiplied by a constant observer gain 140 at a sixth multiplier 138 and the product is applied to a fifth summing node 142 where it is added to the previous resistance value $R_{previous}$. The result is restricted by a second limiter 144 to values between the upper and lower resistance limits $R_{max}$ and $R_{min}$, thereby producing a resistance value R.

The resistance value R then is processed by a first unit delay 145 to produce the previous resistance value $R_{previous}$ that is fed back to the fourth and fifth summing nodes 134 and 142 during the next computation cycle of the compensation function 100. A seventh multiplier 146 multiplies the resistance value R by the current setpoint to produce a feedforward term that is applied to another input of the third summing node 130.

The third summing node 130 also receives a derivative term produced by the third processing stage 123. In that third processing stage 123, a second unit delay 152 provides an output value that corresponds to the previous current error from the prior computation cycle of the compensation function 100. The previous current error is subtracted from the present current error $I_{error}$ at a sixth summing node 150 to produce a current error difference. The current error difference then is multiplied at an eighth multiplier 154 by a constant derivative gain 156 to produce the derivative term that is applied to the third summing node 130. The output of the third summing node 130 is a desired voltage level for driving the valve's solenoid coil.

That desired voltage level from the third summing node 130 is applied to one input of a minimum value selector circuit 157 which has another input that receives a battery terminal voltage value. The battery terminal voltage is measured and low pass filtered by the controller at process block 162 to produce the value that is applied to the minimum value selector circuit 157. The lesser value of the battery terminal voltage and the desired voltage level from the minimum value selector circuit 157 is processed by a third unit delay 158 to produce the previous selected value which is fed back to the dividend input of the first divider 132.

The desired voltage level from the third summing node 130 also is translated into a fraction of the voltage level available from the battery or other electrical power source of the machine. To do so, the desired voltage value is applied to the dividend input of a second divider 160, the output of which is multiplied in a ninth multiplier 164 by a value corresponding to the 100 percent duty cycle of the PWM signal for driving the valve's solenoid coil. This produces a product that defines a percentage of the full PWM duty cycle which is adjusted by an offset value 166 in the seventh summing node 168 to produce a value defining the duty cycle for the PWM valve driver 58. The duty cycle value is limited at a third limiter 170 to a range between 0% and 100%. This limiting is necessary as the desired voltage level may exceed the maximum voltage available across the battery terminals or other power supply and thus otherwise could be unattainable. The limited PWM output value indicates the duty cycle for the pulse width modulation circuit in the valve drivers 58 and is sent to those drivers.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method by which a servomechanism operates an electrohydraulic valve, the method comprising:
   receiving a current setpoint which designates a desired level of electric current to be applied to a coil of the electrohydraulic valve;
   sensing an actual level of electric current flowing through the coil to produce a coil current value;

producing a current error value based on the current setpoint and the coil current value;

using the coil current value to produce an error value denoting a change in the resistance of the coil;

deriving a coil resistance value by using the coil current value to produce a resistance error value denoting a change in the resistance of the coil, and using the resistance error value to produce the coil resistance value;

deriving a desired voltage level for the coil in response to the coil resistance value and the current error value; and generating a PWM signal for driving the coil based on the desired voltage level.

2. The method as recited in claim 1 wherein deriving a coil resistance value comprises steps of:

dividing a previous value of the desired voltage level by the coil current value to produce an estimated resistance value;

subtracting a previous coil resistance value from the estimated resistance value to produce a resistance error value;

multiplying the resistance error value by an observer gain value; and adding the previous coil resistance value and the result of the multiplying to produce the coil resistance value.

3. The method as recited in claim 2 further comprising limiting the resistance error value to a predefined range of values to produce a limited resistance error value; and employing the limited resistance error value as the resistance error value in the multiplying step.

4. The method as recited in claim 3 wherein limiting the resistance error value employs limits derived from a nominal resistance value defined for the coil.

5. The method as recited in claim 2 further comprising limiting the coil resistance value to a predefined range of values to produce a limited coil resistance value; and using the limited coil resistance value in deriving a desired voltage level.

6. The method as recited in claim 5 wherein limiting the coil resistance value employs limits derived from a nominal resistance value defined for the coil.

7. The method as recited in claim 1 wherein deriving a coil resistance value also employs a previous value of the desired voltage level.

8. The method as recited in claim 1 wherein deriving a desired voltage level further comprises multiplying the coil resistance value by the current setpoint and adding the result to the current error value.

9. The method as recited in claim 1 wherein producing the current error value comprises calculating a current error representing a difference between the current setpoint and the coil current value; and multiplying the current error by a proportional gain.

10. The method as recited in claim 1 wherein:

producing the current error value comprises calculating a current error representing a difference between the current setpoint and the coil current value; and deriving a desired voltage level further comprises deriving a derivative of the current error and multiplying the derivative of the current error by a derivative gain value.

11. The method as recited in claim 1 further comprising sensing an actual voltage level from a voltage source and dividing the desired voltage level by the actual voltage level to produce a value that is used to generate the PWM signal.

12. The method as recited in claim 1 wherein the coil current value is produced by acquiring a plurality of samples of the electric current flowing through the coil during a give period of the PWM signal; and averaging the plurality of samples.

13. A method by which a servomechanism operates an electrohydraulic valve, the method comprising:

receiving a current setpoint which designates a desired level of electric current to be applied to a coil of the electrohydraulic valve;

sensing an actual level of electric current flowing through the coil;

producing a proportional term by calculating difference between the current setpoint and the actual level of electric current to produce a current error; and multiplying the current error by a constant proportional gain value;

producing an feedforward term by:

(a) dividing a previous value of a desired voltage level for the coil by the actual level of electric current to produce an estimated resistance value, (b) subtracting a previous coil resistance value from the estimated resistance value to produce a resistance error value, (c) multiplying the resistance error value by an observer gain value, (d) adding the previous coil resistance value and the result of the multiplying to produce a coil resistance value, and (e) multiplying the coil resistance value by the current setpoint to produce the feedforward term;

producing a derivative term by determining a derivative of the current error and multiplying the derivative of the current error by a derivative gain value;

deriving a desired voltage level for the coil by combining the proportional term, the feedforward term, and the derivative term; and generating a PWM signal for driving the coil based on the desired voltage level.

14. The method as recited in claim 13 further comprising limiting the resistance error value to a predefined range of values.

15. The method as recited in claim 13 further comprising limiting the coil resistance value to a predefined range of values.

16. The method as recited in claim 13 wherein generating a PWM signal comprises producing a duty cycle value based on the desired voltage level, adding a PWM offset to the duty cycle value, and limiting the result to a predetermined range of values.

* * * * *